United States Patent
Jankovic et al.

(10) Patent No.: US 6,678,608 B2
(45) Date of Patent: Jan. 13, 2004

(54) ROBUST INTERPOLATION METHOD FOR IMPROVED AUTOMATIVE ENGINE CONTROL DURING TRANSIENT ENGINE OPERATION

(75) Inventors: Mrdjan J. Jankovic, Birmingham, MI (US); Stephen William Magner, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 10/045,384

(22) Filed: Nov. 9, 2001

(65) Prior Publication Data

US 2003/0093215 A1 May 15, 2003

(51) Int. Cl.⁷ .............................. G06F 19/00; F01L 1/34
(52) U.S. Cl. ............. 701/115; 123/406.49; 123/406.65; 123/90.15; 701/110
(58) Field of Search .................................. 701/115, 110, 701/102; 123/90.11, 90.15, 406.2, 406.24, 406.13, 406.6, 406.65, 406.49, 406.59, 406.64

(56) References Cited

U.S. PATENT DOCUMENTS

| | | | |
|---|---|---|---|
| 5,168,851 A | | 12/1992 | Itoyama et al. ............. 123/399 |
| 5,239,963 A | | 8/1993 | Ikebe et al. .................. 123/419 |
| 5,622,144 A | * | 4/1997 | Nakamura et al. ....... 123/90.15 |
| 5,927,252 A | | 7/1999 | Atsumi ..................... 123/406.2 |
| 6,234,144 B1 | * | 5/2001 | Yamaguchi et al. ..... 123/90.15 |
| 2002/0117126 A1 | * | 8/2002 | Kaneko ........................ 123/21 |

FOREIGN PATENT DOCUMENTS

JP 10-176557 * 6/1998 ........... F02D/13/02

* cited by examiner

Primary Examiner—Hieu T. Vo
(74) Attorney, Agent, or Firm—Julia Voumras; Allan J. Lippa

(57) ABSTRACT

A system (12) and method for determining a value for a control variable for an engine (10) are provided. The system (12) includes an electronic control unit (ECU) (62) configured to obtain a plurality of pairs of programmed timing values for the opening and closing, respectively, of an intake valve (30) and exhaust valve (32) in a cylinder (14) of the engine (10) responsive to different sets of engine operating conditions. The ECU (62) is further configured to obtain a corresponding plurality of conditional values for the control variable responsive to the speed of, and load on, the engine (10) and the plurality of pairs of programmed timing values. Finally, the ECU (62) is configured to determine through interpolation the value for the control variable responsive to the plurality of conditional values. The system and method enable accurate determination of engine control variables during transient conditions using existing engine data.

21 Claims, 3 Drawing Sheets

ROBUST INTERPOLATION METHOD FOR IMPROVED AUTOMATIVE ENGINE CONTROL DURING TRANSIENT ENGINE OPERATION

FIELD OF THE INVENTION

This invention relates to systems and methods for control of vehicle engines and, in particular, to a system and method for determining values for engine control variables.

BACKGROUND OF THE INVENTION

Conventional vehicle engines are electronically controlled through the use of a programmable electronic control unit ("ECU"). The ECU is used to monitor engine performance and to control the operation of a wide variety of engine components such as fuel injectors, camshaft actuators, spark plugs and the throttle valve. In controlling the various engine components, the ECU determines values for a wide variety of control variables.

In recent years advances such as variable cam timing, variable valve lift, and charge motion control have introduced additional degrees of freedom and increased complexity to engine control. One method of dealing with this increased complexity has been to schedule only limited sets of values for control variables-typically those values encountered during steady state operation of the engine. This method suffers from a significant drawback, however. During transient operation of the engine, the speed of the engine, the load on the engine, and the position of engine components such as the camshaft(s) reach new steady state values at different rates. As a result, the actual values for various engine control variables may be quite different from the scheduled values during transient operation. This can lead to a variety of problems. For example, spark timing may not be optimized leading to engine knock, increased fuel consumption and reduced driveability.

There is thus a need for a system and method for determining the value for a control variable for an engine that will minimize and/or eliminate one or more of the above-identified deficiencies.

SUMMARY OF THE INVENTION

The present invention provides a system and a method for determining the value for a control variable for an engine. The engine may comprise a conventional fuel-injected internal combustion engine and may define a plurality of cylinders in which intake and exhaust valves are opened and closed to control the delivery and exhaust of air and fuel.

A method in accordance with the present invention includes the step of obtaining a plurality of pairs of programmed timing values for intake valve opening and exhaust valve closing in a cylinder of the engine responsive to a speed of the engine and a load on the engine. Each pair of the plurality of pairs of programmed timing values is based on a different one of a plurality of sets of predetermined operating conditions for the engine. For example, one set of operating conditions may include a condition in which the camshaft actuator is locked. Another set of operating conditions may include a condition corresponding to a predetermined altitude and a condition of optimal output torque for the engine.

The inventive method may also include the step of obtaining a plurality of conditional values for the control variable, each conditional value of the plurality of conditional values responsive to the speed, the load, and a different one of the plurality of pairs of programmed timing values. Finally, the inventive method may include the step of determining the value for the control variable responsive to the plurality of conditional values for the control variable. In particular, the determining step may include an interpolation between the previously determined conditional values for the control variable using an interpolation method such as the "inverse distance" method.

A system in accordance with the present invention includes an electronic control unit that is configured to perform several functions. In particular, the unit is configured to obtain a plurality of pairs of programmed timing values for intake valve opening and exhaust valve closing in a cylinder of the engine responsive to a speed of the engine and a load on the engine, each pair of the plurality of pairs of programmed timing values based on a different one of a plurality of sets of predetermined operating conditions for the engine. The unit is further configured to obtain a plurality of conditional values for the control variable, each conditional value of the plurality of conditional values responsive to the speed, the load, and a different one of the plurality of pairs of programmed timing values. Finally, the unit is configured to determine the value for the control variable responsive to the plurality of conditional values for the control variable.

The present invention represents an improvement as compared to conventional systems and methods for determining values for control variables for an engine. In particular, the inventive system and method improve engine performance during transient conditions by enabling a more accurate determination of optimal values for control variables without requiring increased scheduling of the control variables.

These and other advantages of this invention will become apparent to one skilled in the art from the following detailed description and the accompanying drawings illustrating features of this invention by way of example.

DETAILED DESCRIPTION OF THE PREFERRED EMBODIMENT

Figure 1:
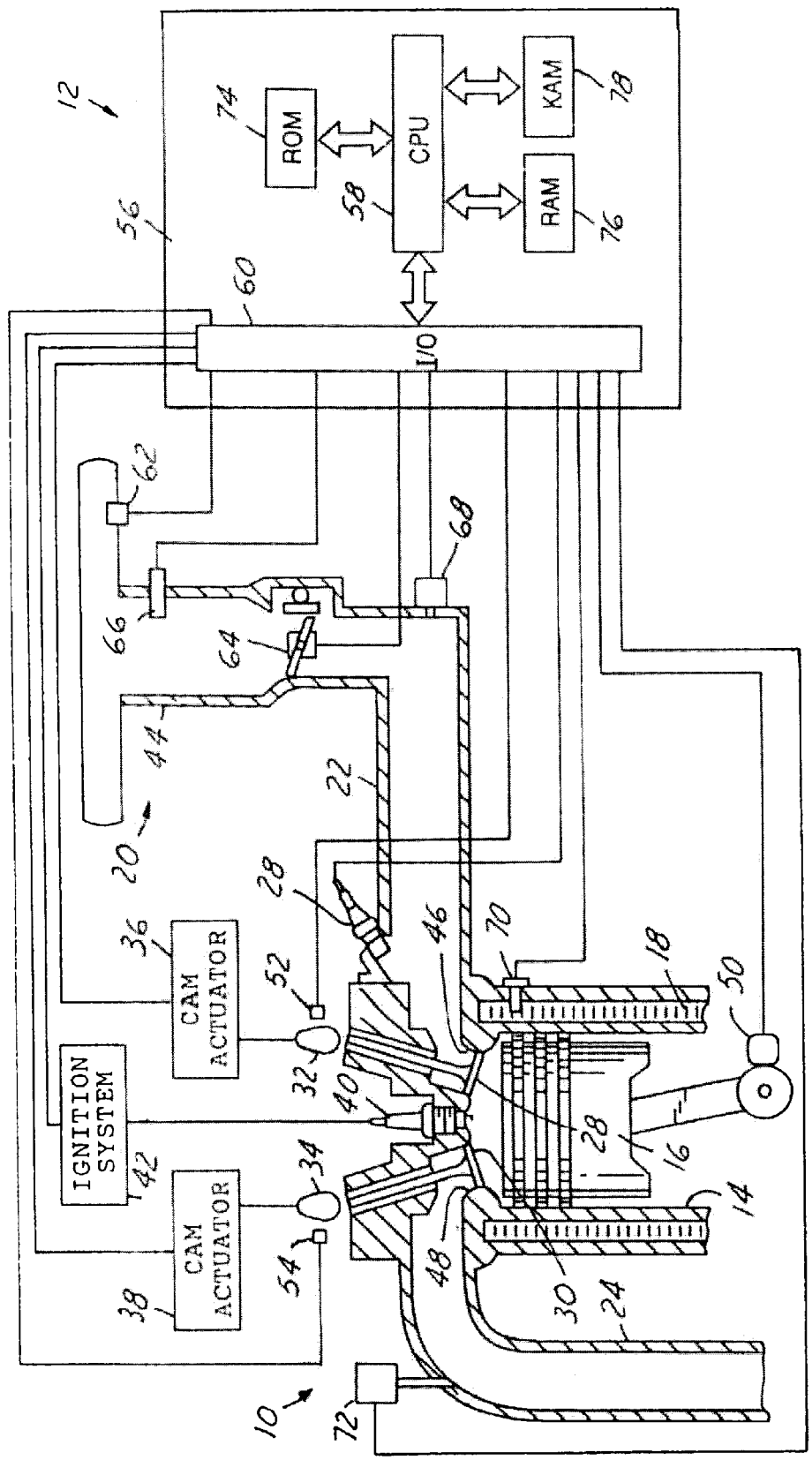
FIG. 1 is a schematic diagram illustrating an internal combustion engine incorporating a system for determining a value for a control variable of the engine in accordance with the present invention.

Referring now to the drawings wherein like reference numerals are used to identify identical components in the various views, FIG. 1 illustrates an internal combustion engine 10. FIG. 1 also illustrates a system 12 in accordance with the present invention for determining the value of a control variable for engine 10.

Engine 10 is designed for use in a motor vehicle. It should be understood, however, that engine 10 may be used in a wide variety of applications. Engine 10 provides motive energy to a motor vehicle or other device and is conventional in the art. Engine 10 may define a plurality of combustion chambers or cylinders 14 and may also include a plurality of pistons 16, coolant passages 18, a throttle 20, an intake manifold 22, an exhaust manifold 24, fuel injectors 26, intake valves 28, exhaust valves 30, camshafts 32, 34, camshaft actuators 36, 38, spark plugs 40, and an ignition system 42.

Cylinders 14 provide a space for combustion of an air/fuel mixture to occur and are conventional in the art. In the illustrated embodiment, only one cylinder 14 is shown. It will be understood, however, that engine 10 may define a plurality of cylinders 14 and that the number of cylinders 14 may be varied without departing from the spirit of the present invention.

Pistons 16 are coupled to a crankshaft (not shown) and drive the crankshaft responsive to an expansion force of the air-fuel mixture in cylinders 14 during combustion. Pistons 16 are conventional in the art and a piston 16 may be disposed in each cylinder 14.

Coolant passages 18 provide a means for routing a heat transfer medium, such as a conventional engine coolant, through engine 10 to transfer heat from cylinders 14 to a location external to engine 10. Passages 18 are conventional in the art.

Throttle 20 controls the amount of air delivered to intake manifold 22 and cylinders 14. Throttle 20 is conventional in the art and includes a throttle plate or valve (not shown) disposed within a throttle body 44. The position of the throttle plate may be responsive to the vehicle operator's actuation of an accelerator pedal or may be electronically controlled.

Intake manifold 22 provides a means for delivering charged air to cylinders 14 from throttle 20. Manifold 22 is conventional in the art. An intake port 46 is disposed between each cylinder 14 and manifold 22.

Exhaust manifold 24 is provided to vent exhaust gases from cylinders 14 after each combustion event. Manifold 24 is also conventional in the art and may deliver exhaust gases to a catalytic converter (not shown). An exhaust port 48 is disposed between each cylinder 14 and manifold 24.

Fuel injectors 26 are provided to deliver fuel in controlled amounts to cylinders 14 and are conventional in the art. Although only one fuel injector 26 is shown in the illustrated embodiment, it will again be understood that engine 10 will include additional fuel injectors 26 for delivering fuel to other cylinders 14 in engine 10.

Intake valves 28 open and close each intake port 46 to control the delivery of air, from manifold 22, and fuel, from fuel injectors 28, to the respective cylinders 14. Intake valves are conventional in the art.

Exhaust valves 30 open and close each exhaust port 48 to control the venting of exhaust gases from the respective cylinders 14. Exhaust valves 30 are also conventional in the art.

Camshafts 32, 34 control the movement of valves 28, 30, respectively. Camshafts 32, 34 may comprise dual independent variable position intake and exhaust valve camshafts capable of independently altering the positional relationship of various cams on camshafts 32, 34, relative to the engine crankshaft. One or both of camshafts 32, 34 may include a pulse wheel (not shown) disposed at one end of the camshaft 32, 34. The pulse wheel may include a plurality of teeth for use in measuring camshaft position to aid in cylinder identification and cam timing.

Actuators 36, 38 control the angular position of camshafts 32, 34 relative to the engine crankshaft. Actuators 36, 38 are conventional in the art.

Spark plugs 40 are provided to ignite the air/fuel mixture in cylinders 14. Spark plugs 40 are also conventional in the art. Although only one spark plug is shown in the illustrated embodiment, it should be understood that each cylinder 14 will include at least one spark plug 40.

Ignition system 42 delivers electrical current to spark plugs 40. System 42 is conventional in the art may comprise a solid-state ignition system (i.e., a distributor-less system).

System 12 is provided to determine a value for a control variable of engine 10. System 12 may form part of a larger system for controlling various components of engine 10 including the throttle plate (not shown), fuel injectors 26, camshaft actuators 36, 38, and ignition system 42. System 12 may include a profile ignition pickup (PIP) sensor 50 and cylinder identification (CID) sensors 52, 54 (only one of which is shown in the illustrated embodiment). System also includes an electronic control unit (ECU) 56.

PIP sensor 50 is provided to indicate the position of the engine crankshaft (not shown) and is conventional in the art. Sensor 50 generates a signal that is indicative of the speed of engine 10 and is input to ECU 56.

CID sensors 52, 54 are provided to identify the cylinder 14 housing the current or next combustion event and to aid in intake valve and exhaust valve timing and spark timing. CID sensors 52, 54 are conventional in the art and may detect the rotational position of camshafts 32, 34 responsive to rotation of pulse wheels (not shown) attached to one end of the camshafts 32, 34 as described and illustrated in commonly assigned U.S. Pat. No. 5,245,968, the entire disclosure of which is incorporated herein by reference. Sensors 52, 54 generate signals that are indicative of the rotational position of the camshafts 32, 34 and are input to ECU 56.

ECU 56 is provided to control engine 10. ECU 56 may comprise a programmable microprocessor or microcontroller or may comprise an application specific integrated circuit (ASIC). ECU 56 may include a central processing unit (CPU) 58 and an input/output (I/O) interface 60. Through interface 60, ECU 56 may receive a plurality of input signals including signals generated by sensors 50, 52, 54 and other conventional sensors, including but not limited to, an air temperature sensor 62, a throttle position sensor 64, a mass air flow (MAF) sensor 66, a manifold absolute pressure (MAP) sensor 68, an engine coolant temperature sensor 70, and a Heated Exhaust Gas Oxygen (HEGO) sensor 72. Also through interface 60, ECU 56 may generate a plurality of output signals including one or more signals used to control fuel injectors 26, camshaft actuators 36, 38, and ignition system 42. ECU 56 may also include one or more memories including, for example, Read Only Memory (ROM) 74, Random Access Memory (RAM) 76, and a Keep Alive Memory (KAM) 78 to retain information when the ignition key is turned off.

Figure 2:
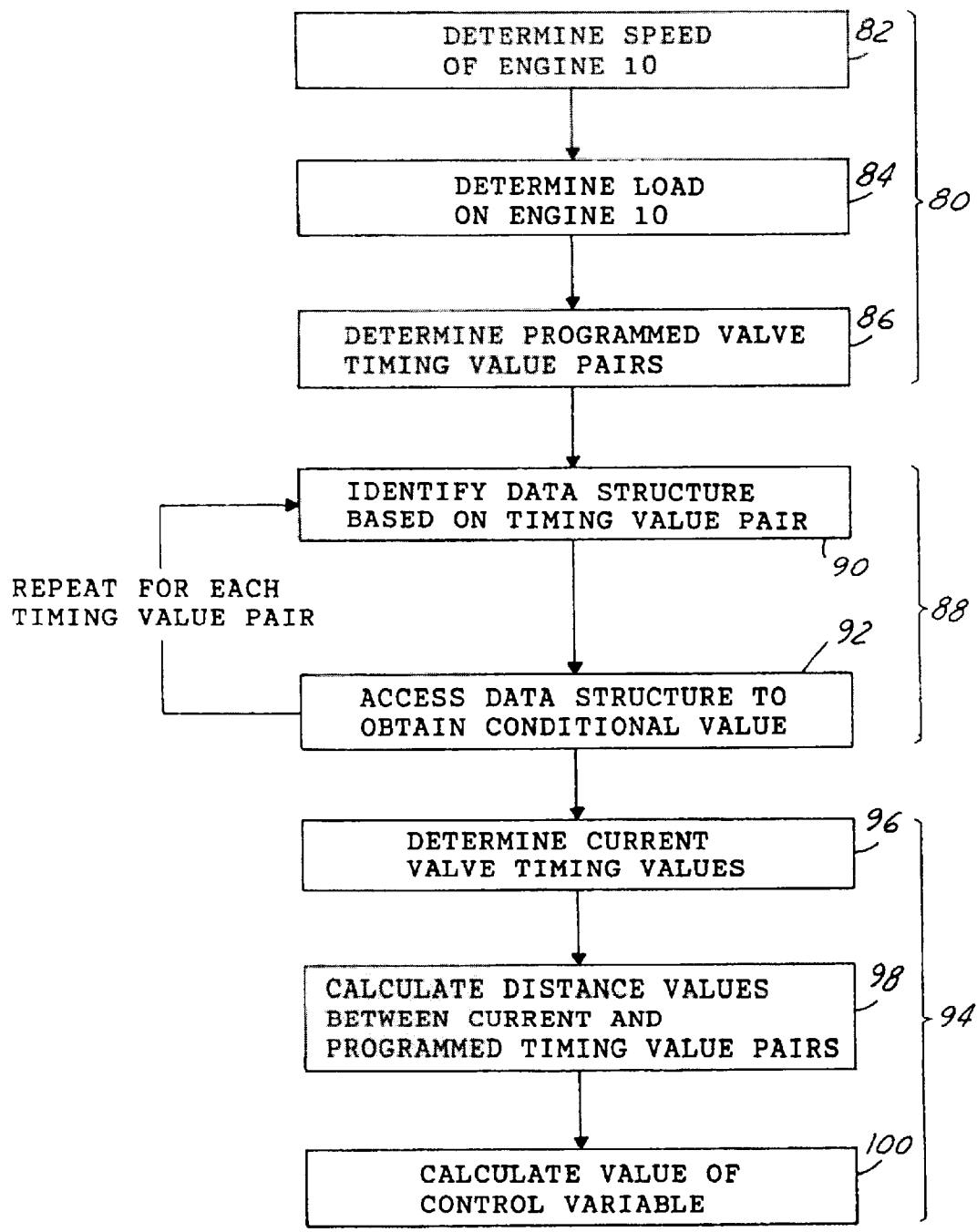
FIG. 2 is a flow chart diagram illustrating a method for determining the value of a control variable of an engine in accordance with the present invention.

Referring now to FIG. 2, a method for determining a value for a control variable for engine 10 will be described. The method or algorithm may be implemented by system 12 wherein ECU 56 is configured to perform one or more steps of the method by programming instruction or code (i.e., software). The instructions may be encoded on a computer storage medium such as a conventional diskette or CD-ROM and may be copied into memory 74 of ECU 56 using conventional computing devices and methods.

A method in accordance with the present invention may begin with the step 80 of obtaining a plurality of pairs of programmed timing values for the opening and closing of an intake valve 28 and an exhaust valve 30, respectively, in one of cylinders 14 of engine 10. In the exemplary embodiment of the invention described herein, these timing value pairs will be designated ivo_sl, evc_sl and ivo_op, evc_op and ivo_d, evc_d. Step 80 may include several substeps. First, step 80 may include the substep 82 of determining the speed of engine 10. ECU 56 may be configured, or encoded, to determine the speed of engine 10 responsive to signals generated by PIP sensor 50 or in other ways conventional in the art. Step 80 may also include the substep 84 of determining the load on engine 10 which can serve as an estimate of engine torque. ECU 56 may again be configured, or encoded, to determine the load on engine 10 in a conventional manner.

Figure 3:
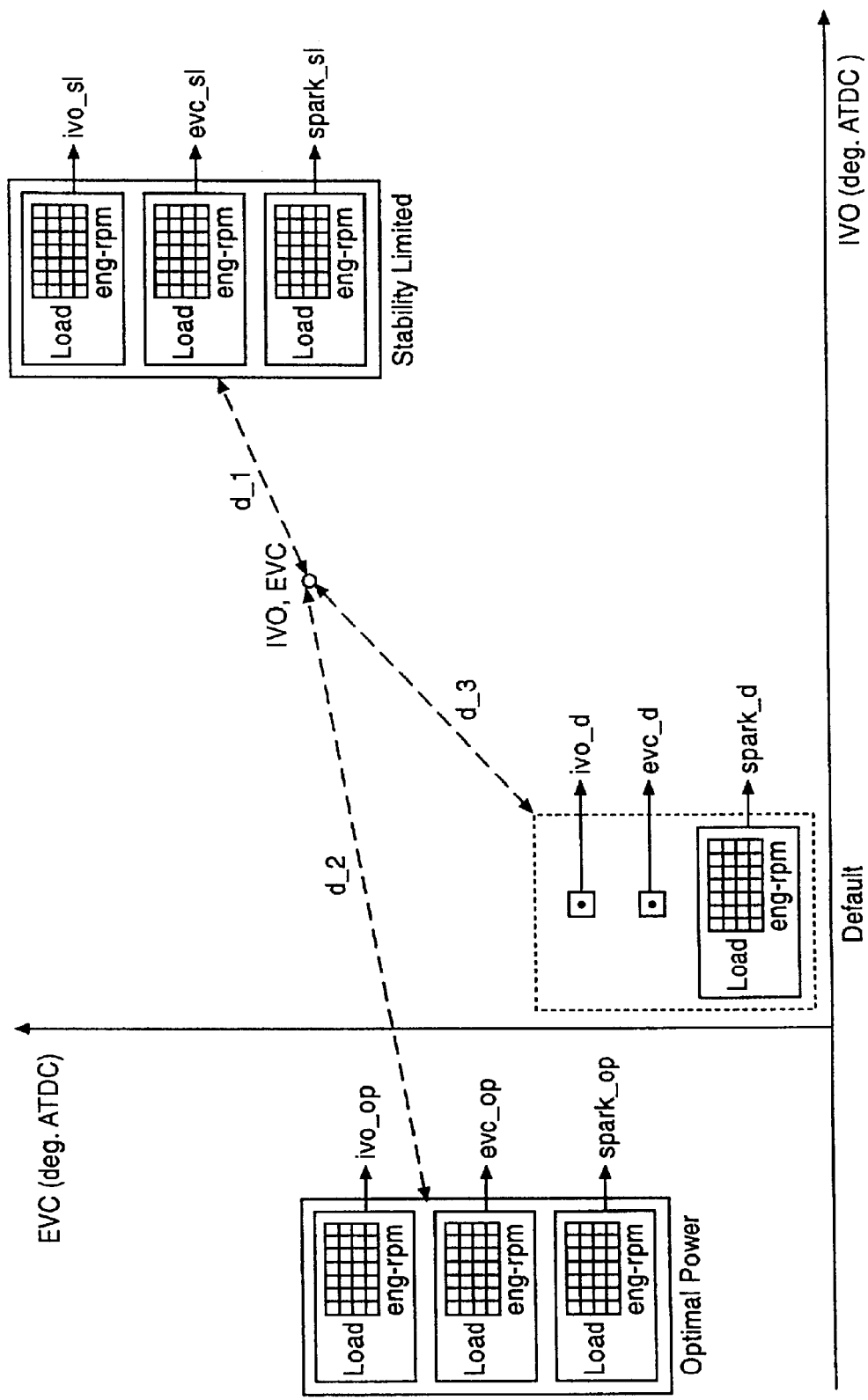
FIG. 3 is a graphical illustration of one embodiment of the method of FIG. 2.

Step 80 may finally include the substep 86 of determining the pairs of programmed timing values ivo_sl, evc_sl and ivo_op, evc_op and ivo_d, evc_d for the opening of intake valve 28 and closing of exhaust valve 30 responsive to the determined speed of engine 10 and load on engine 10. ECU 56 may be configured, or encoded, to access one or more data structures stored in a memory, such as memory 74, responsive to the determined speed and load to obtain the timing values ivo_sl, evc_sl, ivo_op, evc_op, ivo_d, and evc_d. In particular, the timing values ivo_sl, evc_sl, ivo_op, evc_op, ivo_d, and evc_d may be stored in look-up tables in memory 74 that are accessed responsive to the determined speed and load. Because such tables are generally accessed at discrete values for speed and load, bi-linear or double-linear interpolation may be used to interpolate between these discrete values. Referring to FIG. 3, the timing values may be expressed as degrees after top dead center (deg. ATDC) and the timing value pairs may be illustrated as nodes on a graph of deg. ATDC for the closing of exhaust valve 30 vs. deg. ATDC for the opening of intake valve 28.

Each look-up table may hold timing values for intake valve opening and exhaust valve closing based on different sets of predetermined operating conditions for engine 10. As is known in the art, these tables are configured to produce an optimal combination of timing values for intake valve opening and exhaust valve closing at a given speed and load for specific operating conditions of engine 10. One set of tables for intake valve opening and exhaust valve closing may be configured for "stability limited" (SL) operating conditions in which the conditions include a predetermined ambient temperature, optimal fuel economy, and optimal emissions. Another set of tables for intake valve opening and exhaust valve closing may be configured for "optimal power" (OP) operating conditions in which the conditions include a predetermined altitude and optimal output torque (i.e., wide open throttle). Another set of tables may be configured for "default" (D) operating conditions in which the condition includes locked camshaft actuators 36, 38 which occasionally result from certain conditions such as cold temperatures or low oil pressure in engine 10. It should be understood that the number of sets of operating conditions identified herein as well as the specific conditions themselves are exemplary only. The use of additional pairs of timing values for intake valve opening and exhaust valve closing obtained under a variety of operating conditions may improve performance in the inventive system and method.

Referring again to FIG. 2, a method in accordance with the present invention may also include the step 88 of obtaining a plurality of conditional values for the control variable. In one embodiment of the invention illustrated herein, the control variable comprises spark timing in a cylinder 14 of engine 10 and the conditional values will be designated spark_sl, spark_op, and spark_d. It should be understood, however, that the control variable may comprise any of a variety of engine control variables such as volumetric efficiency of engine 10, estimated torque at wide open throttle, exhaust temperature and pressure, and estimated back flow from cylinder 14 to manifold 22.

Each conditional value may be responsive to the previously determined speed of, and load on, engine 10 and a different one of the plurality of pairs of programmed timing values. It should also be understood, however, that determination of the conditional values may involve additional inputs as well. For example, spark timing values may also be determined partly in response to temperatures and charge motion control valve position.

Step 88 may include several substeps. First, step 88 may include the substep 90 of identifying a data structure storing conditional values for the control variable. ECU 56 may be configured, or encoded, in this substep to identify the relevant data structure responsive to one of the previously determined pairs of timing values for intake valve opening and exhaust valve closing. The data structures may again comprise look-up tables in which conditional values for the control variable for a given timing value pair are grouped together. Referring to FIG. 3, in the illustrated embodiment, for example, conditional values spark_sl, spark_op, and spark_d for the spark timing control variable may be stored in tables corresponding to conditions when the intake valve opening and exhaust valve closing are equal to ivo_sl, evc_sl and ivo_op, evc_op and ivo_d, evc_d, respectively.

Referring again to FIG. 2, step 88 may then include the substep 92 of accessing the identified data structure responsive to the previously determined speed and load to obtain a conditional value for the control variable. Again, because such tables are generally accessed at discrete values for speed and load, bi-linear or double-linear interpolation may be used to interpolate between these discrete values. Substeps 90, 92 may be repeated for each pair of timing values obtained in step 80. Accordingly, where the control variable comprises spark timing, the conditional values spark_sl, spark_op, and spark_d may each be obtained from separate tables corresponding to the timing value pairs ivo_sl, evc_sl and ivo_op, evc_op and ivo_d, evc_d, respectively, as illustrated in FIG. 3.

Referring again to FIG. 2, the inventive method may finally include the step 94 of determining the value for the engine control variable responsive to the plurality of conditional values for the control variable. Step 94 involves an interpolation between the previously obtained conditional values to obtain the final value. This interpolation enables improved engine control performance during transient conditions without sacrificing the benefits of prior art approaches that seek to minimize the resources required to schedule engine control variables by limiting engine control variable scheduling to steady state values.

In one embodiment of the invention, step 94 includes several substeps used to implement an "inverse distance" interpolation between the conditional values for the control variable. The "inverse distance" form of interpolation has several advantages. First, inverse distance interpolation is less complex than other interpolation methods and, therefore, does not require as many resources from ECU 56. Second, inverse distance interpolation can account for any "node" positions (see FIG. 3) defined by the pairs of valve timing values including, for example, overlapping positions and collinear positions. Third, inverse distance interpolation is easily scalable, allowing the addition of more timing value pairs, or nodes, for greater accuracy. It should be understood, however, that other interpolation methods may be used including other types of interpolation commonly used in terrain modeling.

Step 94 may first include the substep 96 of determining current timing values ivo and evc for the opening of intake valve and the closing of exhaust valve. ECU 56 may be configured, or encoded, in a conventional manner to determine the current timing values ivo, evc responsive to signals generated by PIP sensor 50 and CID sensors 52, 54. From the signals generated by sensors 50, 52, 54, ECU 56 can determine the phase difference between the crankshaft and the respective camshafts 32, 34 and determine the current position of the intake and exhaust valves 28, 30. The current timing values ivo, evc, therefore, may again be expressed as degrees after top dead center (deg. ATDC) and may be plotted in a graphical manner with the programmed timing value pairs ivo_sl, evc_sl and ivo_op, evc_op and ivo_d, evc_d as shown in FIG. 3.

Referring again to FIG. 2, step 94 may also include the substep 98 of calculating a plurality of distance values corresponding to differences between the current timing values ivo, evc and the previously determined plurality of programmed timing value pairs (i.e., ivo_sl, evc_sl and ivo_op, evc_op and ivo_d, evc_d in the illustrated embodiment). In particular, ECU 56 may be configured, or encoded, to compute the "square" distances between the programmed timing values and the current timing values within a defined plane as follows:

$$d_1 = (ivo-ivo\_sl)^2 + (evc-evc\_sl)^2 + \epsilon$$

$$d_2 = (ivo-ivo\_op)^2 + (evc-evc\_op)^2 + \epsilon$$

$$d_3 = (ivo-ivo\_d)^2 + (evc-evc\_d)^2 + \epsilon$$

where $\epsilon$ represents a positive constant designed to prevent distance values $d_1$, $d_2$, and $d_3$ from equaling zero. The value $\epsilon$ should be a relatively small number and should be less than one percent (1%) of the range of movement of one of camshaft actuators 36, 38 in the illustrated embodiment.

Step 94 may finally include the substep 100 of calculating the value of the control variable responsive to the distance values $d_1$, $d_2$, and $d_3$ and the plurality of previously determined conditional values for the control variable. As stated earlier, in one embodiment of the invention, the control variable comprises spark timing and the conditional values may comprise the values spark_sl, spark_op, and spark_d which are representative of conditional spark timing values for a given engine speed, engine load, and intake valve opening and exhaust valve closing timing values under the "stability limited," "optimal power" and "default" operating conditions for engine 10. It should be understood, however, that the inventive method may be used to determine values for other engine control variables as well.

ECU 56 may be configured, or encoded, to calculate the value of the control variable as follows:

$$spark = \frac{\frac{1}{d_1} * spark\_sl + \frac{1}{d_2} * spark\_op + \frac{1}{d_3} * spark\_d}{\frac{1}{d_1} + \frac{1}{d_2} + \frac{1}{d_3}}$$

The above-identified formula is scalable thereby allowing for the use of additional valve timing values and conditional values for the control variable to improve the accuracy of the the interpolation. The generalized formula is as follows:

$$spark = \frac{\sum_{i=1}^{m} \left(\frac{1}{d_i} spark\_i\right)}{\sum_{i=1}^{m} \frac{1}{d_i}}$$

Additional valve timing values and conditional control variable values may be obtained by adding additional look-up tables configured in response to different sets of engine operating conditions. Alternatively, additional valve timing values and conditional control variable values may be obtained from existing look-up tables (i.e., using the same engine operating conditions) and compensating for the differences in actual and assumed engine speed and load as follows:

$$d_1 = (ivo-ivo\_i)^2 + (evc-evc\_i)^2 + w_N(N-N\_i)^2 + w_{load}(load-load\_i)^{2+}$$

A system and method in accordance with the present invention for determining the value for a control variable for an engine represent a significant improvement as compared to conventional systems and methods. The inventive system and method enable accurate and efficient determination of control variable values during transient operating conditions as compared to conventional systems and methods. Further, the inventive system and method accomplish this task without requiring significant additional scheduling of control variables thereby limiting the system resources required and preserving the benefits of the same conventional systems and methods.

We claim:

1. A system for determining a value for a control variable for an engine, comprising:

an electronic control unit configured to obtain a plurality of pairs of programmed timing values for intake valve opening and exhaust valve closing in a cylinder of said engine responsive to a speed of said engine and a load on said engine, each pair of said plurality of pairs of programmed timing values based on a different one of a plurality of sets of predetermined operating conditions for said engine, to obtain a plurality of conditional values for said control variable, each conditional value of said plurality of conditional values responsive to said speed, said load, and a different one of said plurality of pairs of programmed timing values, and to determine said value for said control variable responsive to said plurality of conditional values for said control variable.

2. The system of claim 1 wherein said control variable comprises spark timing in said cylinder of said engine.

3. The system of claim 1 wherein said electronic control unit is further configured, in obtaining a plurality of pairs of programmed timing values, to access a plurality of data structures in a memory responsive to said speed and said load, each of said data structures including programmed timing values for intake valve opening or exhaust valve corresponding on one of said plurality of sets of predetermined operating conditions for said engine.

4. The system of claim 1 wherein one of said plurality of sets of operating conditions includes a first condition of a predetermined temperature, a second condition of optimal fuel economy of said engine, and a third condition of minimum emissions from said engine.

5. The system of claim 1 wherein one of said plurality of sets of operating conditions includes a first condition of a predetermined altitude and a second condition of optimal output torque by said engine.

6. The system of claim 1 wherein one of said plurality of sets of operating conditions includes a condition wherein a cam actuator in said engine is locked.

7. The system of claim 1 wherein said electronic control unit is further configured, in determining said value for said control variable, to determine current timing values for said intake valve opening and said exhaust valve closing, to calculate a plurality of distance values corresponding to differences between said current timing values and said plurality of programmed timing values and to calculate said value of said control variable responsive to said distance values and said plurality of conditional values for said control variable.

8. An article of manufacture, comprising:
   a computer storage medium having a computer program encoded therein for determining a value for a control variable for an engine, said computer program including:
   code for obtaining a plurality of pairs of programmed timing values for intake valve opening and exhaust valve closing in a cylinder of said engine responsive to a speed of said engine and a load on said engine, each pair of said plurality of pairs of programmed timing values based on a different one of a plurality of sets of predetermined operating conditions for said engine;
   code for obtaining a plurality of conditional values for said control variable, each conditional value of said plurality of conditional values responsive to said speed, said load, and a different one of said plurality of pairs of programmed timing values; and
   code for determining said value for said control variable responsive to said plurality of conditional values for said control variable.

9. The article of manufacture of claim 8 wherein said control variable comprises spark timing in said cylinder of said engine.

10. The article of manufacture of claim 8 wherein said code for obtaining a plurality of pairs of programmed timing values includes code for accessing a plurality of data structures in a memory responsive to said speed and said load, each of said data structures including programmed timing values for intake valve opening or exhaust valve corresponding on one of said plurality of sets of predetermined operating conditions for said engine.

11. The article of manufacture of claim 8 wherein one of said plurality of sets of operating conditions includes a first condition of a predetermined temperature, a second condition of optimal fuel economy of said engine, and a third condition of minimum emissions from said engine.

12. The article of manufacture of claim 8 wherein one of said plurality of sets of operating conditions includes a first condition of a predetermined altitude and a second condition of optimal output torque by said engine.

13. The article of manufacture of claim 8 wherein one of said plurality of sets of operating conditions includes a condition wherein a cam actuator in said engine is locked.

14. The article of manufacture of claim 8 wherein said code for determining said value of said control variable includes:
   code for determining current timing values for said intake valve opening and said exhaust valve closing;
   code for calculating a plurality of distance values corresponding to differences between said current timing values and said plurality of programmed timing values; and,
   code for calculating said value of said control variable responsive to said distance values and said plurality of conditional values for said control variable.

15. A method for determining a value for a control variable for an engine, comprising the steps of:
   obtaining a plurality of pairs of programmed timing values for intake valve opening and exhaust valve closing in a cylinder of said engine responsive to a speed of said engine and a load on said engine, each pair of said plurality of pairs of programmed timing values based on a different one of a plurality of sets of predetermined operating conditions for said engine;
   obtaining a plurality of conditional values for said control variable, each conditional value of said plurality of conditional values responsive to said speed, said load, and a different one of said plurality of pairs of programmed timing values;
   determining said value for said control variable responsive to said plurality of conditional values for said control variable.

16. The method of claim 15 wherein said control variable comprises spark timing in said cylinder of said engine.

17. The method of claim 15 wherein said step of obtaining a plurality of pairs of programmed timing values includes the substeps of:
   determining said speed of said engine;
   determining said load on said engine; and,
   accessing a plurality of data structures in a memory responsive to said speed and said load, each of said data structures including programmed timing values for intake valve opening or exhaust valve corresponding on one of said plurality of sets of predetermined operating conditions for said engine.

18. The method of claim 15 wherein one of said plurality of sets of operating conditions includes a first condition of a predetermined temperature, a second condition of optimal fuel economy of said engine, and a third condition of minimum emissions from said engine.

19. The method of claim 15 wherein one of said plurality of sets of operating conditions includes a first condition of a predetermined altitude and a second condition of optimal output torque by said engine.

20. The method of claim 15 wherein one of said plurality of sets of operating conditions includes a condition wherein a cam actuator in said engine is locked.

21. The method of claim 15 wherein said determining step includes the substeps of:
   determining current timing values for said intake valve opening and said exhaust valve closing;
   calculating a plurality of distance values corresponding to differences between said current timing values and said plurality of programmed timing values; and,
   calculating said value of said control variable responsive to said distance values and said plurality of conditional values for said control variable.

* * * * *